Jan. 14, 1930. W. M. FROST 1,743,665
INSECT TRAP
Filed Dec. 12, 1927
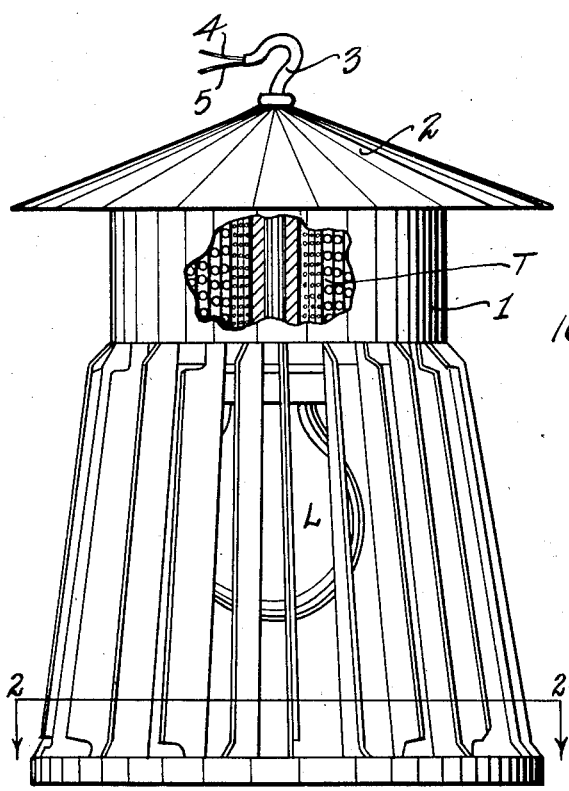
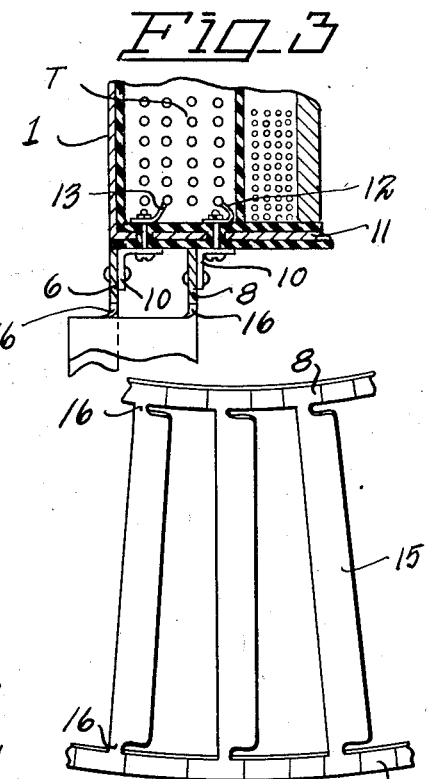
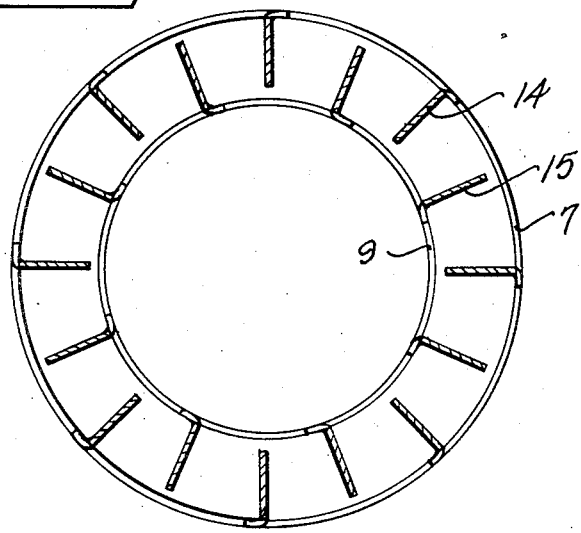
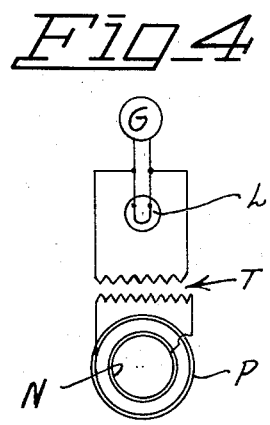
Inventor
William M. Frost.
By Herbert Smith,
Attorney Patented Jan. 14, 1930

1,743,665

UNITED STATES PATENT OFFICE

WILLIAM M. FROST, OF SPOKANE, WASHINGTON

INSECT TRAP

Application filed December 12, 1927. Serial No. 239,369. REISSUED

My present invention relates to an improved insect trap of the electrocuting type and designed as a probable device which may be hung up or suspended in the open or used within an enclosure as for instance in a house or other building. The primary object of the invention is the provision of a device of this character which will be attractive in appearance, capable of manufacture at comparative low cost of production, efficient in its operation, and durable in its use. With these ends in view, the invention consists in certain novel combinations and arrangements of parts involving the two electrodes of the electrocuting device and their association with other parts of the trap as will hereinafter be more fully set forth and claimed.

The trap includes an electric transformer in which the magnet, the primary coil and the secondary coil are thoroughly insulated from each other and have no electrical connections. The transformer is combined with a trap in such manner that the terminals are connected to the alternately arranged electrodes of the trap, and the transformer not only transforms the current to a high frequency but also acts as a condenser or accumulator in building up the electrostatic charge on the electrodes which form a grid, and the energy or force in the grids is thus increased for the purpose of electrocuting or destroying insects that come in contact with two of the opposed electrodes.

In the accompanying drawings, I have illustrated one complete example of the physical embodiment of my invention wherein the parts are combined and arranged according to the best mode I have so far devised for the practical application of the principles of my invention.

Figure 1 is a view in side elevation of an electrocuting trap according to my invention and having a portion broken away to disclose the transformer;

Fig. 2 is a horizontal sectional view at line 2—2 of Fig. 1;

Fig. 3 is an enlarged detail sectional view of a portion of the transformer showing a portion of two of the electrodes attached thereto, and the connections between the transformer and the electrodes.

Fig. 4 is an electrical diagram showing the manner of electrically connecting the parts of the trap; and Fig. 5 is a detail view showing in elevation several blades of one of the electrodes.

In carrying out my invention, the parts may be electrically connected as indicated in Fig. 4, where the generator is designated by the letter G, a lamp is designated L, the transformer as T, and the positive and negative electrodes as a whole are respectively designated P and N. The trap is somewhat in the form of a lantern and the transformer T is enclosed within a cylindrical housing 1 which is provided with an outspreading conical top 2 that is designed to shed water from the parts beneath this top. The trap is portable and may be hung up or suspended from suitable supports by means of a top central hook 3 which is preferably made tubular to provide for the introduction of the electric wires 4 and 5 to the transformer T within the sleeve 1.

The electrodes P and N each comprise a pair of circular bands as 6 and 7 for the positive electrode, and 8 and 9 for the negative electrode. The bands 6 and 7 are of greater diameter than the bands 8 and 9, and the lower bands 7 and 9 are of larger diameter than the upper bands 6 and 8. The upper bands are attached to brackets 10 and the brackets in turn are attached to the insulated bottom 11 of the transformer or housing 1, and in Fig. 3, it will be seen that connectors 12 and 13 of the transformer provide electrical energy to the electrodes N and P respectively. The upper and lower bands of the respective electrodes are connected by flat blades 14 and 15 which are fashioned integral with the bands that they connect, and at 16 the blades are twisted so that they extend in radial direction from the center of the open lower portion of the trap. The blades as shown in Fig. 2 alternately extend outwardly and inwardly from the center of the trap and because of the frusto-conical shape of the trap the space between adjoining blades at their upper ends is less than the space between the same blades at the lower ends. Because of the radial disposition of the blades, the opening between adjoining blades at the outer side of the trap is greater than the opening between the same blades at the inner side of the trap. Thus with the lamp L supported within the trap as indicated in Fig. 1, a lure (or a bait may be used) is provided for the insects which is visible from all directions and will attract the insects. The blades 14 and 15 are of sufficient width to permit an insect to enter the outside opening, but are sufficiently close to insure that the wings of the insect will contact with opposed electrodes and thus the insect will be electrocuted. The lower end of the space between adjoining blades is greater than the upper end, and therefore the electrocuted insect is free to fall through to the ground, or it may be caught by a pan suspended beneath the trap. The wide blades prevent the insect from clinging to them as a support, as for instance could be done with a wire, and the smooth adjoining faces of these blades prevent the insect from clinging thereto.

Having thus fully described my invention, what I claim as new and desire to secure by Letters Patent is:—

1. The combination in an electrocuting insect trap with a housing and a transformer therein, of a trap portion below the housing comprising electrodes connected with the transformer, said electrodes including alternately spaced radially extending blades, and a lure within the trap.

2. The combination in an electrocuting trap with a transformer, a housing therefor, and an outspreading conical top for the housing, of a lower trap portion comprising a pair of upper concentric bands and a pair of lower concentric bands, and radially extending, alternately arranged, positive and negative blades connecting said bands.

3. The combination in an electrocuting insect trap with a supporting portion, of a pair of circular concentric bands attached to said support, a pair of lower circular concentric bands, and spaced radial blades connecting said upper and lower bands and forming alternately positive and negative electrodes.

In testimony whereof I affix my signature.

WILLIAM M. FROST.